(12) United States Patent
Aizawa

(10) Patent No.: US 8,810,669 B2
(45) Date of Patent: Aug. 19, 2014

(54) IMAGE INPUT DEVICE HAVING DIFFERENT WIRELESS COMMUNICATION STATES, CONTROL METHOD AND PROGRAM THEREFOR

(75) Inventor: Takashi Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1325 days.

(21) Appl. No.: 11/573,069

(22) PCT Filed: Aug. 25, 2005

(86) PCT No.: PCT/JP2005/015960
§ 371 (c)(1),
(2), (4) Date: Feb. 1, 2007

(87) PCT Pub. No.: WO2006/022432
PCT Pub. Date: Mar. 2, 2006

(65) Prior Publication Data
US 2008/0043110 A1     Feb. 21, 2008

(30) Foreign Application Priority Data

Aug. 26, 2004   (JP) ................. 2004-247090

(51) Int. Cl.
*H04N 5/232*    (2006.01)
*H04N 5/225*    (2006.01)
(Continued)

(52) U.S. Cl.
CPC .... *H04L 12/2805* (2013.01); *H04N 2201/0044* (2013.01); *H04L 12/2809* (2013.01); *H04N 2201/0049* (2013.01); *H04N 1/00204* (2013.01); *H04N 5/232* (2013.01); *H04L 12/282* (2013.01); *H04N 2201/0015* (2013.01); *H04W 8/005* (2013.01); *H04W 40/24* (2013.01); *H04L 61/2015* (2013.01); *H04N 2201/0055* (2013.01); *H04L 67/14* (2013.01); *H04L 12/281* (2013.01); *H04L 2012/2841* (2013.01); *H04L 29/12226* (2013.01); *H04N 2201/0084* (2013.01)

USPC ....................... 348/211.2; 348/207.1

(58) Field of Classification Search
USPC ............... 348/211.99–211.1, 211.3, 211.322
See application file for complete search history.

(56) References Cited

U.S. PATENT DOCUMENTS 5,805,298 A * 9/1998 Ho et al. ................. 358/402
6,058,428 A * 5/2000 Wang et al. ............. 709/232

(Continued)

FOREIGN PATENT DOCUMENTS

| GB | 2 379 126 A | 2/2003 |
|---|---|---|
| JP | 2002-244829 | 8/2002 |

(Continued)

*Primary Examiner* — Twyler Haskins
*Assistant Examiner* — Carramah J Quiett
(74) *Attorney, Agent, or Firm* — Fitzpatrick, Cella, Harper & Scinto

(57) ABSTRACT

An image input device connects to a network, and achieves, when a user wants to connect to a particular communication counterpart by operating the image input device, reliable connection with the counterpart that the user wants to connect by smoothly avoiding connection with other communication counterparts. Meanwhile, if the user wants to connect to the image input device by operating an information processor, connection with a communication counterpart which has issued a connection request earliest is achieved without operation of the image input device. For example, a digital camera has a wireless communication function of wirelessly connecting to a PC (personal computer), which is an information processor. Pairing information for identifying a PC to be a communication counterpart is set in advance, by connecting to the PC via a USB cable. When the start of connection with the PC is instructed, the digital camera transitions into a state capable of wireless connection with the PC based on the set pairing information.

10 Claims, 15 Drawing Sheets

(51) Int. Cl.
*H04L 12/28* (2006.01)
*H04N 1/00* (2006.01)
*H04L 29/08* (2006.01)
*H04W 8/00* (2009.01)
*H04W 40/24* (2009.01)
*H04L 29/12* (2006.01)

(56) References Cited

U.S. PATENT DOCUMENTS

| | | | |
|---|---|---|---|
| 6,167,469 A * | 12/2000 | Safai et al. | 710/62 |
| 6,396,537 B1 * | 5/2002 | Squilla et al. | 348/239 |
| 6,784,924 B2 * | 8/2004 | Ward et al. | 348/207.1 |
| 7,027,836 B2 | 4/2006 | Zacks et al. | |
| 7,075,568 B2 | 7/2006 | Aizawa | 348/211.99 |
| 2002/0147819 A1 * | 10/2002 | Miyakoshi et al. | 709/228 |
| 2003/0090574 A1 | 5/2003 | Seaman et al. | 348/207.99 |
| 2003/0220077 A1 | 11/2003 | Hosokawa | 455/41.2 |
| 2004/0056846 A1 | 3/2004 | Aizawa | 345/173 |
| 2004/0125214 A1 | 7/2004 | Oka et al. | 348/211.3 |
| 2004/0192383 A1 * | 9/2004 | Zacks et al. | 455/557 |
| 2005/0188319 A1 * | 8/2005 | Shinkai | 715/751 |

FOREIGN PATENT DOCUMENTS

| | | |
|---|---|---|
| JP | 2002-359623 | 12/2002 |
| JP | 2003-259446 | 9/2003 |
| JP | 2004-104788 | 4/2004 |
| JP | 2005-223710 | 8/2005 |

* cited by examiner

FIG. 5

| ESSID | UINT 8 [32] | INFORMATION ABOUT ESSID |
|---|---|---|
| WEPKEY | UINT 8 [13] | INFORMATION ABOUT WEPKEY |
| WEP Enable | UINT 8 | 1: VALID / 0: INVALID<br>IN THE CASE OF SETTING INVALID,<br>VALVE OF WEPKEY IS IGNORED |
| Wireless Mode | UINT 8 | 1: Infrastructure MODE / 0: adhoc MODE |
| Channel | UINT 8 | CHANNEL NUMBER (1 TO 14 CHANNEL)<br>IN Infrastructure Mode,<br>Channel IS AUTOMATICALLY SET<br>DEPENDING ON CHANNEL OF ACCESS POINT |
| DHCPClient Setting | UINT 8 | WHETHER OR NOT TO SET DHCP Client<br>1: TO BE SET / 0: NOT TO BE SET |
| DeviceType | UINT 8 | DEVICE TYPE INFORMATION (DEVICE AS Initiator)<br>1: Computer<br>2: Printer<br>3: Digital Camera |
| DeviceName | UINT 8 [15] | NAME INDICATING DEVICE |
| UUID | String | UUID DESCRIBED IN DeviceDescription<br>(UNIQUE GUID OF Initiator) |

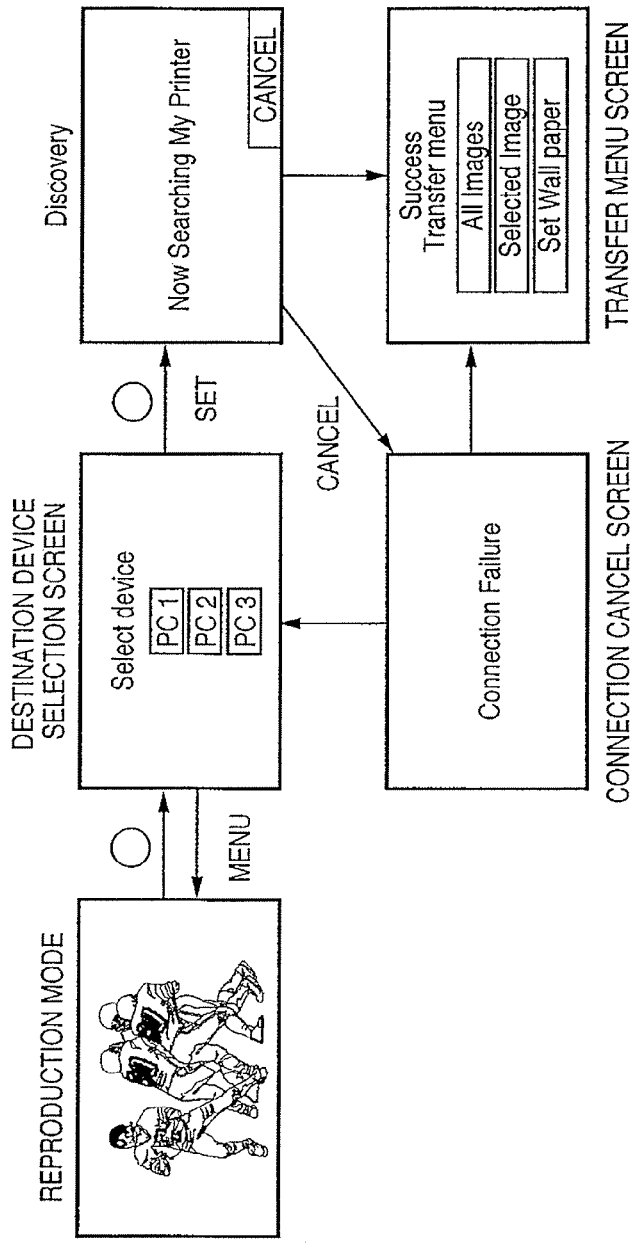

FIG. 9

```
< ?xml version="1.0"? >
<root xmlns="urn: schemas-upnp-org: device-1-0">
  <spec Version>
    <major> 1 </major>
    <minor> 0 </minor>
  </spec Version>
  <URLBase> http://192.168.1.222/< /URLBase>
  <device>
    <deviceType>urn:schemas-upnp-org:device:Basic:1</deviceType>
    <friendlyName>Ganon XY DIGITAL 400</friendlyName>
    <manufacturer>Ganon</manufacturer>
    <modelDescription>Ganon UPnP Digital Camera</modelDescription>
    <modelName>Ganon XY DIGITAL 400</modelName>
    <UDN>uuid:cea815d4-4e67-49b4-ae19-8f2162778d25</UDN>
    <serviceList>
      <service>
        <serviceType>urn:schemas-ganon-com:service:ganonCamera:1</serviceType>
        <serviceId>urn:schemas-ganon-com:serviceId:GanonCameraService1</serviceId>
        <controlURL>dummyURL</controlURL>
        <eventSubURL></eventSubURL>
        <SCPDURL>/dummy.xml</SCPDURL>
        <X_targetId>12345678-1234-1234-1234-123456789abc</X_targetId>
        <X_onService>1</X_onService>
      </service>
    </serviceList>
    <presentationURL>/StartPage.html</presentationURL>
  </device>
</root>
```

IMAGE INPUT DEVICE HAVING DIFFERENT WIRELESS COMMUNICATION STATES, CONTROL METHOD AND PROGRAM THEREFOR

TECHNICAL FIELD

The present invention relates to an image input device, a control method thereof, a program and an image input system, and in particular to an image input device, such as a digital camera, for wirelessly connecting and communicating with an information processor such as a personal computer or a device such as a printer, a control method thereof, a program and an image input system.

BACKGROUND ART

For conventional digital cameras, there have been devised and manufactured systems for recording image data of a taken image or voice data on an internal recording device or a removable recording medium, and connecting to an information processor such as a personal computer (hereinafter simply referred to as "PC") with a cable or the like to transfer the information such as the image data recorded on the recording device or the like. Furthermore, recently, systems for performing printing, not via a PC, but by directly connecting a digital camera and a printer with a cable, have been manufactured.

In such systems, a digital camera and a PC are usually connected via a wired interface such as a USB (universal serial bus), and data exchange is performed between the equipment in accordance with a determined protocol. For example, as protocols for data exchange between a PC and a digital camera, a PTP (Picture Transfer Protocol) specified in a Still Imaging Device Class of USB devices, and a protocol defined in a Mass Storage Device Class, are used.

There is also proposed a standard called PictBridge as a mechanism for directly connecting a digital camera and a printer. According to Version 1.0 of this standard, there is provided a configuration in which a user can utilize operation members, such as switches and operation buttons, and a display device, such as an LCD, on the digital camera side, to select an image to be printed or issue a print instruction when mutual connection is completed. This applicant also proposes the content described above in Japanese Patent Application No. 2004-030838 and the like.

Meanwhile, when a digital camera and a PC are connected with each other, it is common to perform operations on the PC side, and it is not common to cause operations to be performed on the digital camera side.

However, as digital cameras are increasingly spreading, the rate of users unfamiliar with operating a PC is increasing. Accordingly, there is demand for handling images and the like taken by a camera without operating a PC as far as possible.

Accordingly, this applicant has also already proposed a technique in which operations on the camera side are enabled when a PC is connected, under the control of the PC, so that images and the like are displayed on a display device implemented on the camera, and the images and the like are transferred to the PC by operations on the camera side.

As described above, though, conventionally, it is a main purpose to simply transfer image data in a camera to a PC, which is an external device, to store and review it, applications in which a PC and a camera operate in conjunction with each other are increasing recently.

Meanwhile, it has been proposed to adapt digital equipment (devices) to be appropriate for a network, and a mechanism has been sought for enabling devices to communicate with one another by applying the so-called Internet technology. There are also devised network devices, such as a network printer and a network camera, each of which has an IP address and is appropriate for operation control utilizing the TCP/IP protocol, and a part of the network devices are put into practical use.

Furthermore, recently, wireless network technology has been advanced, and it is being promoted to incorporate a wireless communication function in conformity with standards, such as Bluetooth and IEEE 802.11x, into a device.

There is an example in which, in such a case, a procedure is performed for using a discovery method specified in UPnP (Universal Plug&Play) to search for each device, and retrieving and connecting a necessary service and device is performed. It is also proposed to automate parameter setting for wireless connection (Japanese Patent Laid-Open No. 2002-359623).

In this method, the side which searches for a device or service (hereinafter referred to as "a control point") and the side which provides a service are separated, and search information is delivered over a limited network by utilizing the mechanism of UDP multicast. Then, a device having a service capable of responding to it returns a response so that mutual recognition can be performed.

In the case where multiple control points exist, each control point performs UDP multicast to perform a search. A device capable of providing a service returns a response to each control point in response to the search. According to this discovery method, it is possible to perform mutual recognition between each control point and a service or device.

However, in the present situation, it is mainly products such as a network router and a wireless access point that utilize the above-described discovery method to perform mutual recognition and exchange data on a network. As for these products, a logical connection state between a control point and a service-provision device is completed for each operation in many cases.

For example, in the case of an HTTP or FTP server, the number of clients which can be connected at the same time is often determined by the server side in consideration of the capacity of the server side. When the connection state is kept with multiple clients at the same time, the capacity on the server side must be considered so that equal services can be provided to a predetermined maximum number of communication counterparts.

If a client appears after the maximum number of connections has been established with the server, and this client attempts to connect to the server, any one of the connections must be released to keep the number within the maximum number, or the new connection request by the client must be rejected.

When a case is considered where an image input device such as a digital camera connects to such a network, it is conceivable that counterparts to which the image input device can provide services are extremely limited because its resources as a device are extremely poor in comparison with a conventional server. As an extreme example, it is assumed that a device can connect to only one client at the same time, and, as described above, there are multiple control points, which recognize this device at the same time. In this case, if any one control point makes a logical connection to utilize a service of the device, the other control point cannot utilize a service of the device.

In a conventional idea, since it is common that a device such as a digital camera is accessed by operation on the side of a control point such as a PC, it is not necessary to especially consider such a problem. However, it is also conceivable that, for example, a user desires to operate a digital camera, which is on a service-provision side, to connect to a particular PC and push data into the PC from the camera side. In such a case, if a client which is an undesired communication counterpart connects to the camera earlier, the camera cannot connect to a desired client to provide a service.

Thus, when a device with relatively poor resources connects to a network, it is required to consider different use cases such as:
- a case in which a service-provision device is selected by operation by a user from a client, and a client which connects earliest can connect to the device; and
- a case in which connection with a particular counterpart is assumed, and connection with the counterpart is made by operating the device.

DISCLOSURE OF INVENTION

The present invention has been made to solve the above problems. When a user wants to connect to a particular communication counterpart by operating an image input device, connection is certainly made with the communication counterpart by smoothly avoiding connection with other communication counterparts. Meanwhile, when the user wants to connect to the image input device by operating an information processor, connection can be made with a communication counterpart which issues a connection request first, without operating the image input device. The object is to provide such an image input device, a control method therefor, a program and an image input method.

According to the present invention, when a user wants to connect to a particular communication counterpart by operating an image input device such as a digital camera, connection can be certainly made with the counterpart to be connected by smoothly avoiding connection with other communication counterparts. Furthermore, there can be realized a connection form in which, when the user wants to connect to the image input device by operating an information processor such as a PC, connection is made with a communication counterpart which issues a connection request first without operating the image input device.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a diagram showing an example of pairing information stored when pairing is performed;

FIGS. 6A to 6E show schematic diagrams showing an example of transition among screens to be displayed on a display device of the digital camera;

FIG. 9 is a diagram showing an example of device description returned to a control point by the digital camera;

BEST MODE FOR CARRYING OUT THE INVENTION

Preferred embodiments of the present invention will now be described in detail in accordance with the accompanying drawings.

First Embodiment

Figure 1:
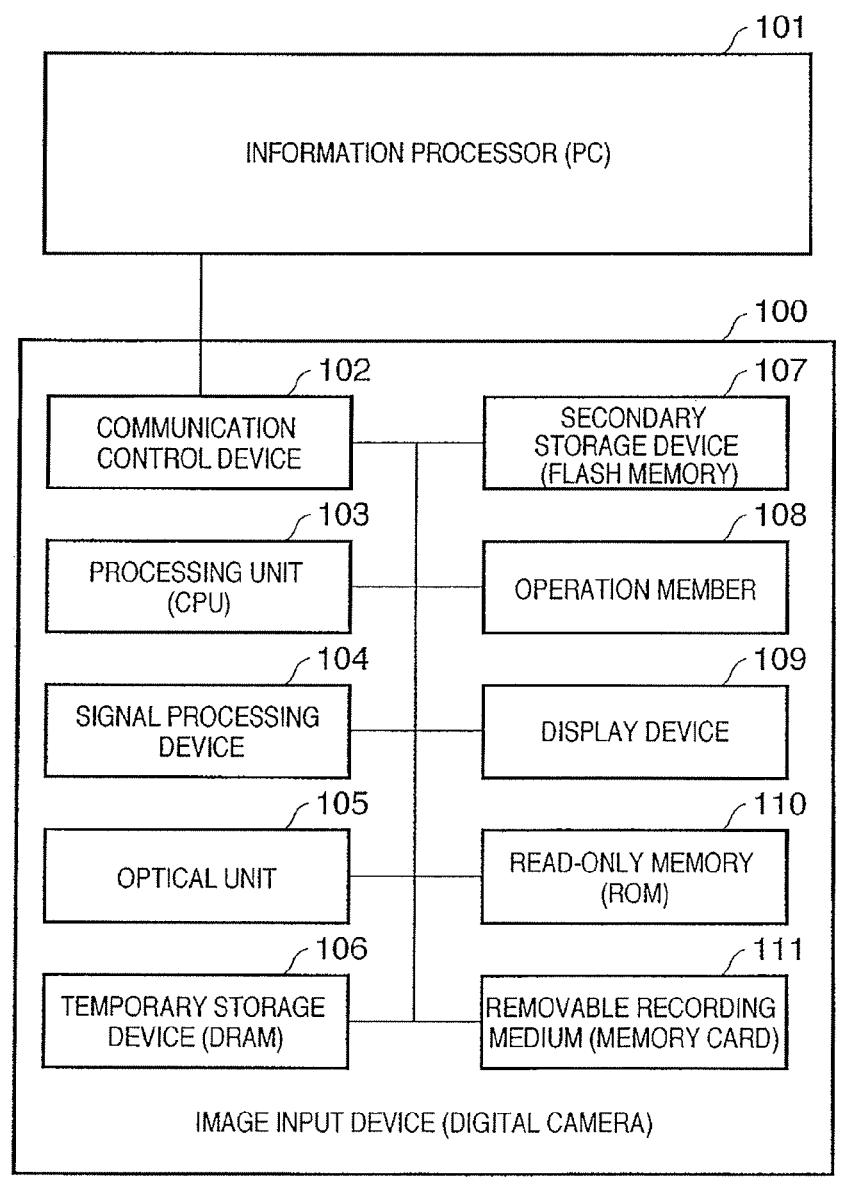
FIG. 1 is a block diagram showing the entire configuration of a digital camera system to which an image input system according to a first embodiment of the present invention is applied.

FIG. 1 is a block diagram showing the entire configuration of a digital camera system to which an image input system according to a first embodiment of the present invention is applied.

In FIG. 1, the digital camera system is configured by an image input device (digital camera) 100 consisting of a digital camera or the like, and an information processor (PC) 101 consisting of a personal computer or the like.

The digital camera 100 includes: an optical unit 105 including a lens, a CCD, a driving circuit and the like; a signal processing circuit 104 for processing image data and the like; an processing unit 103 consisting of a CPU or the like; a temporary storage device 106 consisting of a DRM or the like; a secondary storage device 107 consisting of a flash ROM or the like; an operation member 108 including switches, operation buttons and the like; a display device 109 consisting of an LCD or the like; a read-only memory 110, such as a ROM, to be used for storage of programs; a removable recording medium 111 such as a Compact Flash® memory card; and a communication control device 102 for managing connection with the PC 101.

The digital camera 100 is connected to the PC 101 via the communication control device 102. Various communication forms including a wired connection, such as USB, and wireless connection, such as WirelessLAN are conceivable for connection between the communication control device 102 and the PC 101. In the communication control device 102, a USB device controller or the like is included if a connection is made via USB, and a wireless communication module or the like is installed if a connection is made via WirelessLAN. This embodiment assumes a case of wireless communication via WirelessLAN, and that wireless communication in conformity with IEEE 802.11b is to be performed.

The digital camera 100 may be provided only with the removable recording medium 111 or only with the removable secondary storage device 107 such as an internal flash ROM, depending on the type of the digital camera.

The PC 101 is internally provided with a central processing unit (CPU), a temporary storage device (RAM) and a secondary storage device (a hard disk) and provided with operation devices (a key board and a mouse), a display and the like, which are not shown.

Figure 2:
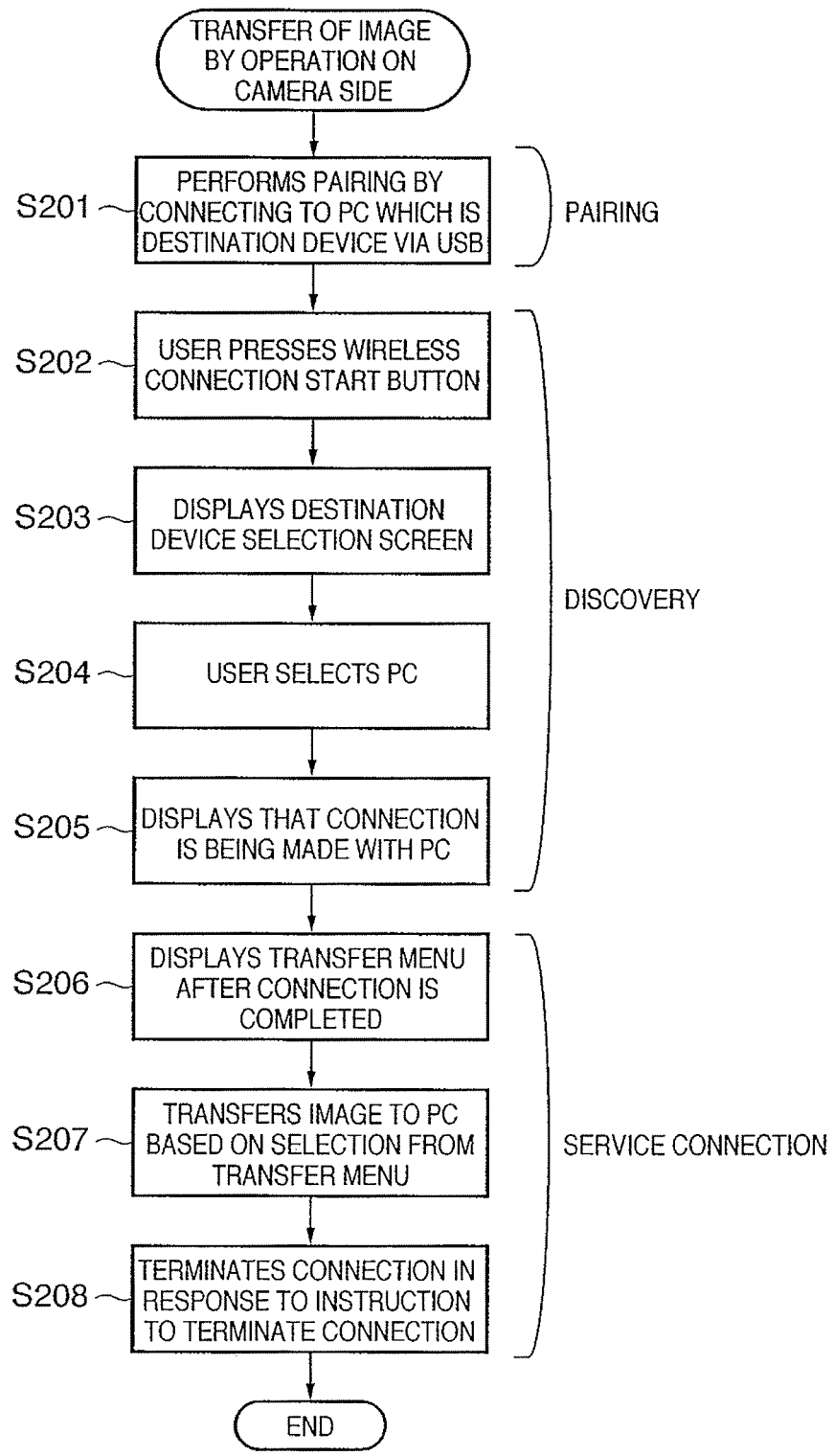
FIG. 2 is a flowchart showing a first use case of the digital camera system in FIG. 1.

FIG. 2 is a flowchart showing a first use case of the digital camera system of FIG. 1. This use case (utilization example) shows that a user transfers an image from the digital camera 100 to the PC 101 mainly by operating the digital camera 100.

In FIG. 2, the user first connects the digital camera 100 and the PC 101, which is a destination device, with a USB cable before performing wireless communication between the digital camera 100 and the PC 101. Then, the user performs pairing in which the user sets the devices, such as the PC and a printer (not shown), the user wants to cause the digital camera 100 to communicate with, for the digital camera (step S201). The user has to perform this pairing only once when performing wireless communication. In this pairing, pairing information (destination device identification information), which is held by destination devices of the digital camera, such as a PC and a printer, and which includes information required for wireless communication and is used for identifying the destination devices, is acquired and stored in the digital camera 100. The details of the destination device identification information are shown in FIG. 5.

In FIG. 5, pairing information basically includes the above-described information required for wireless communication, unique identification information enabling identification of a destination device, information used for shortening the time for wireless connection, and the like. In this embodiment, it is possible to store a destination device to be identified from the set pairing information and the pairing information as a set in association with each other and to display such sets to the user so that the user can make a selection from them.

Next, the USB cable connecting the digital camera 100 and the PC 101 is pulled out, and when the operation member 108 of the digital camera 100 is operated by the user (for example, when a wireless connection start button is pressed), the digital camera 100 transitions to a state capable of wireless connection (step S202).

Figure 7:
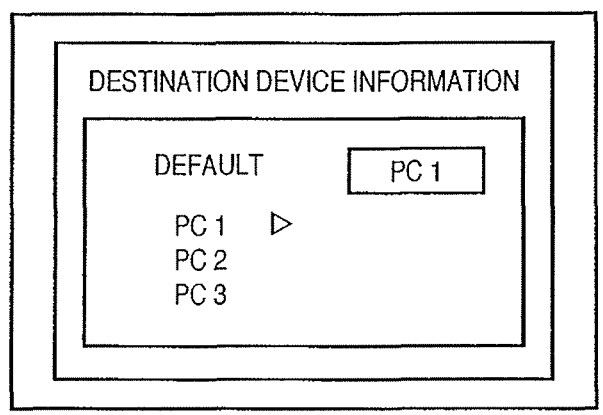
FIG. 7 is a diagram showing an example of a destination device selection screen to be displayed on the display device of the digital camera.

Here, an example of a destination device selection screen to be displayed on the display device 109 of the digital camera 100 is shown in FIG. 7. In FIG. 7, three PC's are displayed as destination devices, and this indicates that pairing information about each device is stored in the digital camera 100, and the user can select one of them as a default destination device. When a destination device is a device such as a printer, it is similarly displayed.

After step S202 in FIG. 2, there is displayed, on the display device 109, a selection screen for causing a user to select which communication counterpart is to be connected among the destination devices stored in the digital camera 100 in association with the pairing information described above (step S203). An example of a transition among screens to be displayed on the display device 109 is shown in FIGS. 6A to 6E.

The screen shown in FIG. 6B is the above-described destination device selection screen for selecting a destination device. In this example, when the wireless connection start button is pressed while the digital camera 100 is in the state of a reproduction mode (FIG. 6A), the screen changes to this screen.

Next, when a PC is selected as a destination device by a user from among the selectable devices displayed on the destination device selection screen (step S204), the digital camera 100 displays, on the display device 109, an indication that connection between the digital camera and the PC is being attempted (step S205). In this case, the digital camera 100 starts a search about whether or not the destination device exists, based on information about the destination device acquired from the destination device when pairing is performed. An example of a screen to be displayed on the display device 109 during the search is shown in FIG. 6C.

Next, when having detected the destination device and achieved connection, the digital camera 100 establishes a connection for providing a predetermined service to the user and displays a transfer menu screen shown in FIG. 6D (step S206). When the user selects a service from the menu and executes it, an image is transferred to the PC based on the selected service (step S207). As a service to be provided to the user here, for example, transfer of all images, transfer of selected images, and display of an image as wallpaper on the display device of the PC 101 are included. However, the service is not limited to these.

Next, when the user operates an operation button or the like for instructing termination of the connection on the operation member 108, the wireless connection is terminated (step S208).

In the above process, step S201 is especially defined as a pairing operation, steps S202 to S205 as a discovery operation, and steps S206 to S208 as a service connection operation. If the specification of a destination device performed when wireless connection is performed, and the subsequent service connection may be done only by operations on the side of the digital camera 100, the logical connection between the camera and the PC is completed in the above description. Therefore, basically, activation or setting of modules required for wireless communication may be performed when the user selects a destination device by operating the digital camera 100 at step S204.

Figure 4:
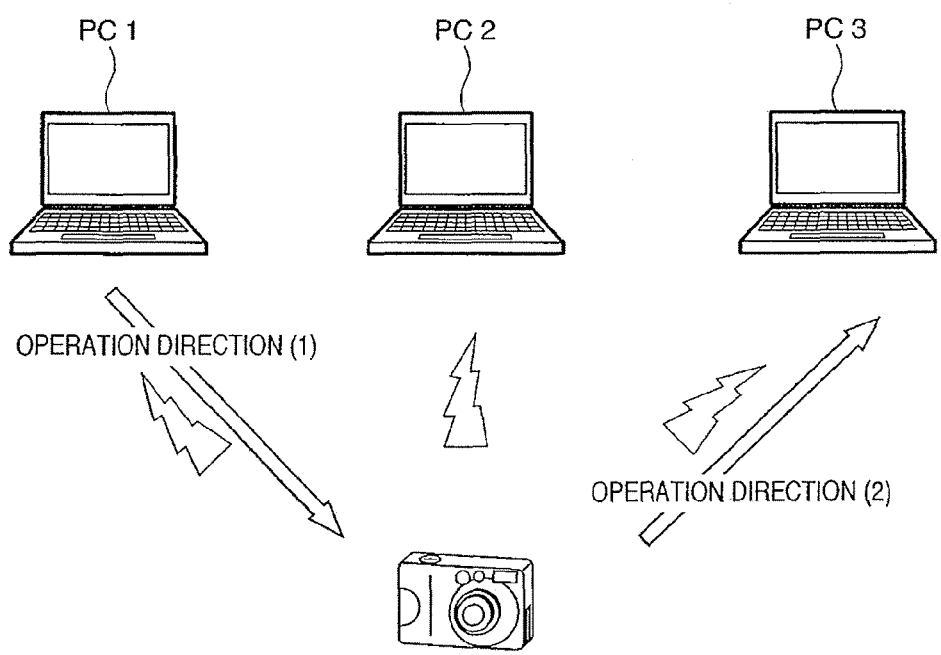
FIG. 4 is a conceptual diagram showing connection and operational relations between a digital camera and a PC.

FIG. 4 is a conceptual diagram showing connection and operational relations between the digital camera 100 and the PC 101. FIG. 4 shows that three PC's PC1 to PC3 recognize a digital camera 100 capable of wireless connection.

A desirable use case is that, if the three PC's PC1 to PC3 are on the same network and can recognize the digital camera 100 at the same time, (1) it is possible to transfer image data in the digital camera 100 to the PC side by an operation on the PC side;

(2) it is possible, when the user wants to operate the digital camera 100, to make a connection only by an operation on the PC side to use a service of the digital camera 100, without performing an operation on the digital camera 100 side in advance as far as possible; and (3) it is possible, when the user wants to transfer an image in the digital camera 100 by operating the digital camera 100, to transfer the image to a PC selected by the user without operating the PC.

Therefore, as shown in FIG. 4, it is desirable that, when a direction from the PC side to the digital camera side (an operation direction (1)) and a direction from the digital camera side to the PC side (an operation direction (2)) are assumed as operation directions, the operation directions coexist without inconsistency.

Figure 3:
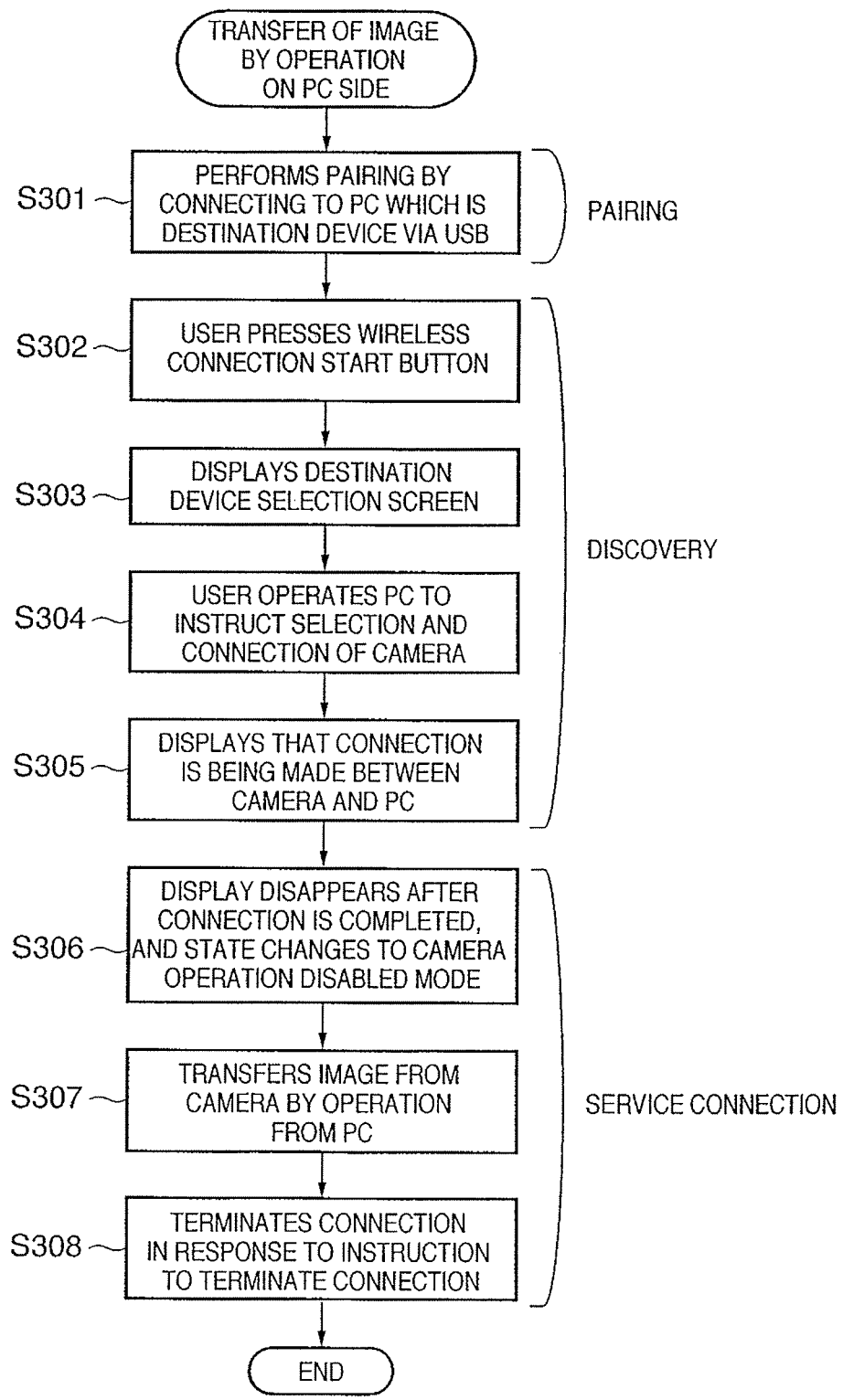
FIG. 3 is a flowchart showing a second use case of the digital camera system in FIG. 1.

FIG. 3 is a flowchart showing a second use case of the digital camera system of FIG. 1. This use case shows that a user transfers an image from the digital camera 100 to the PC 101 mainly by operating the PC 101. That is, the case of the operation direction from the PC side to the digital camera side shown in FIG. 4 is shown. The above-described use case of FIG. 2 shows the case of the operation direction from the digital camera side to the PC side shown in FIG. 4.

In FIG. 3, the user performs pairing before performing wireless communication (step S301). Next, the user pulls out the USB cable and is in a state capable of starting wireless connection. Here, when the user instructs the start of wireless connection by operating the operation member of the digital camera 100 (step S302), the digital camera 100 performs the processing required for wireless connection. In the above-described first use case of operating a digital camera, it is not especially necessary to perform processing required for wireless connection at this point. However, in this example, the processing required for wireless connection is activated at this timing. The setting for wireless connection activated here is performed with information required for above-described wireless connection to the object to be paired set as a default.

Next, a destination device selection screen for selecting whether to connect to a printer or to a PC is displayed (step S303). When the user operates the PC to start service with the digital camera 100 while the digital camera 100 is in this state (step S304), connection with the digital camera 100 is performed, and an indication is displayed on the display device of the digital camera 100 that connection is being attempted (step S305). In this case, if connection is established, the display on the digital camera 100 disappears, and the digital camera changes into a mode in which operation of the digital camera 100 is disabled (a camera operation disabled mode) (step S306).

Then, when an instruction to transfer an image in the digital camera 100 is issued by operating the PC, the image is transferred (step S307). Next, by the user operating an operation button or the like for instructing termination of the connection of the digital camera 100, the wireless connection is terminated (step S308).

Figure 8:
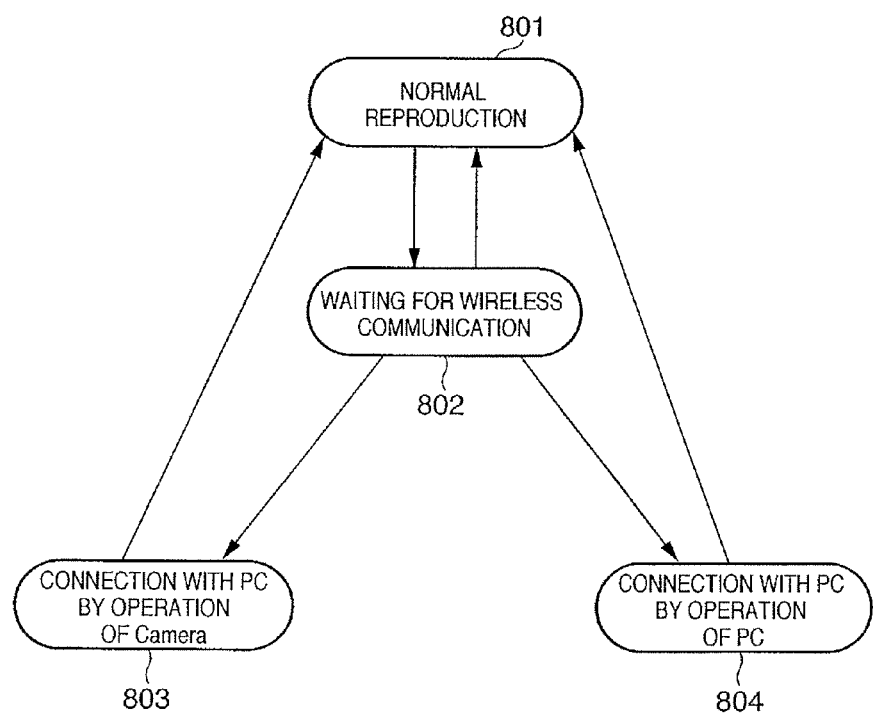
FIG. 8 is a state transition diagram showing transition of states when the digital camera and the PC are wirelessly connected.

FIG. 8 is a state transition diagram showing transition of states when the digital camera 100 and the PC 101 are wirelessly connected.

At step S202 in FIG. 2 and step S302 in FIG. 3, the digital camera 100 is in the reproduction mode, and is not in a wireless connection state yet (801 in FIG. 8). By the operation member 108 of the digital camera 100 being operated by the user, the above-described destination device selection screen in FIG. 6B is displayed on the display device 109. The digital camera 100 is in a "wireless communication waiting" (search waiting) state (802 in FIG. 8) then. In this "wireless communication waiting" state, a module required for wireless communication is activated on the digital camera 100, and participation in a wireless network is started based on the above-described pairing information about a destination device set as a default.

The discovery operation is started when the digital camera 100 changes from the reproduction mode into the "wireless communication waiting" state, and, for example, in the case of UPnP (Universal Plug&Play), an Alive message of SSDP (Simple Service Discover Protocol) is multicast by devices. If there are UPnP control points such as a PC, a response message is also returned in response to M-SEARCH messages or the like issued by the UPnP control points.

At the same time when the digital camera 100 changes from the reproduction mode into the "wireless communication waiting" state (802 in FIG. 8), it is also in a condition capable of accepting the service connection described above. When a service connection request is issued by a particular control point, a connection is made, basically. Then, the state changes to a service connection state by operation of the PC (804 in FIG. 8). Meanwhile, when it is attempted to establish a service connection with a particular PC by operating the digital camera 100, the state changes to a service connection state in which operation of the digital camera 100 is enabled (803 in FIG. 8).

Here, it is in the case where multiple PC's capable of connecting to the digital camera 100 exist as shown in FIG. 4 that a problem is presented. In the "wireless communication waiting" state (802 in FIG. 8), when a UPnP discovery mechanism is implemented as usually done, the sequence on the PC side is as shown in FIG. 10.

Figure 10:
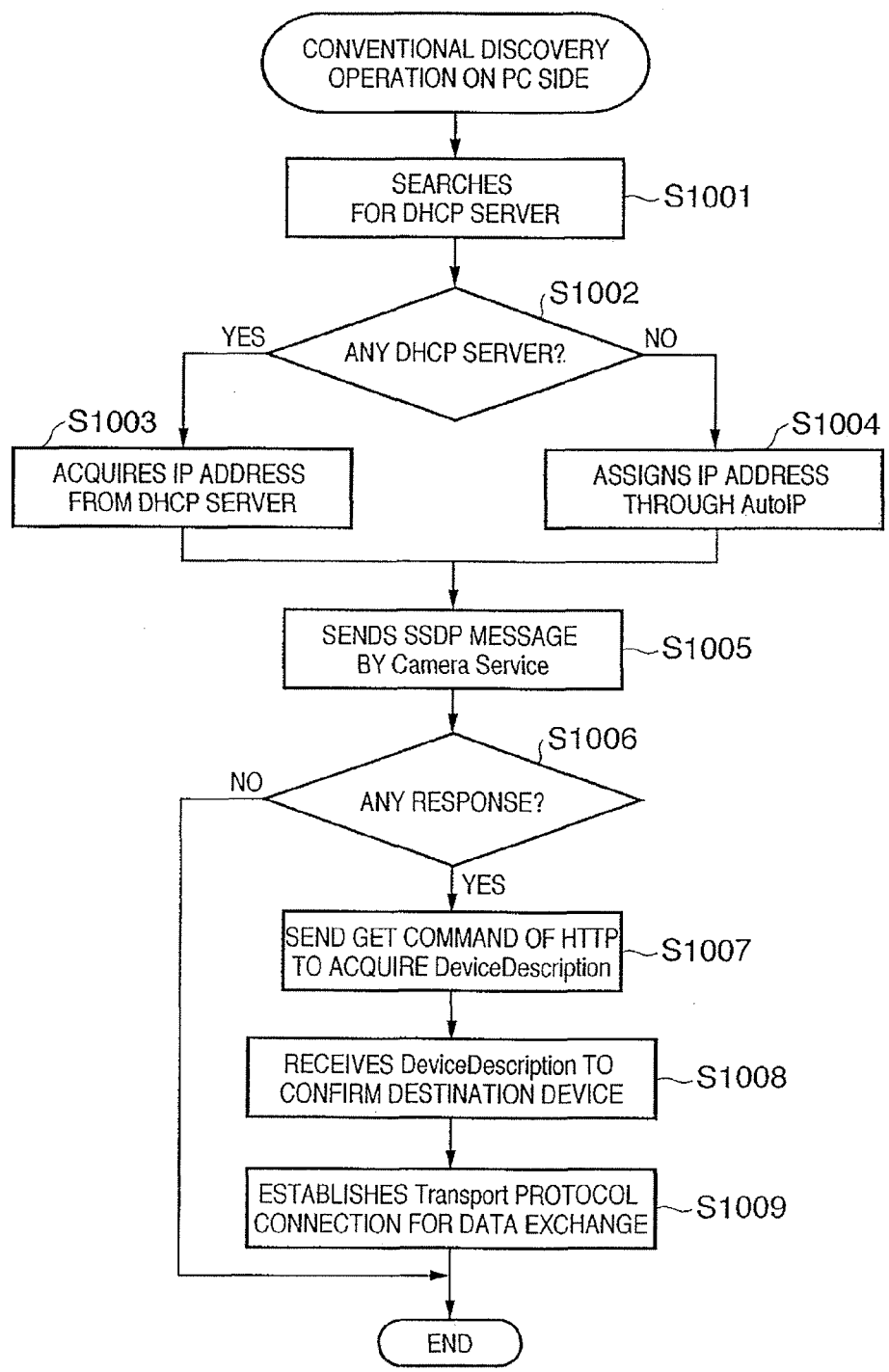
FIG. 10 is a flowchart showing a conventional discovery operation to be performed on the PC side.

FIG. 10 is a flowchart showing a conventional discovery operation to be performed on the PC side (on the side of a common UPnP control point). Here, it is assumed that the PC is connected to a network, such as a wireless LAN, which has a DHCP sever (a network in a so-called infrastructure mode).

In FIG. 10, the PC first searches for a DHCP server (not shown) (Step S1001). When the DHCP server is detected (YES at step S1002), an IP address is acquired from the detected DHCP server (step S1003), and the process proceeds to step S1005.

On the other hand, if the DHCP server is not detected (NO at step S1002), then a private IP address is assigned with the use of the AutoIP mechanism (step S1004), and the process proceeds to step S1005.

At step S1005, an M-SEARCH message of SSDP is sent by Camera Service to search for a device or a service. Next, when a response to the M-SEARCH message is received from a device (YES at step S1006), a GET command of HTTP is sent through a unicast to acquire description information about the device (step S1007).

Subsequently, the device description is received from the device, and the destination device is confirmed (step S1008). Then, a transport protocol connection for data exchange, which is service connection, is established, and the process ends. If a function enabling a device to establish a service connection with multiple counterparts is implemented on the device side or on the PC side, there may be multiple counterparts. The same is not true, however, for such a device with few resources, as the digital camera 100.

In the case where only one service connection can be supported at the same time, if it is assumed that such a sequence is performed by multiple control points at the same time, the result is that only the control point which connects the earliest is connected. This is allowable if the user wants to use a service by operating a PC. However, if the user wants to make a selection from some destination device registered with the digital camera 100 and to transfer an image to the PC by operating the digital camera 100, a problem is presented. Because, if a service connection request is received from another PC earlier, a connection is made with the PC, which is an unintended operation. Means for solving the problem will be described below.

The above problem is solved by devising discovery mechanisms of both of the device side and the PC side (the side of a UPnP control point).

Figure 11:
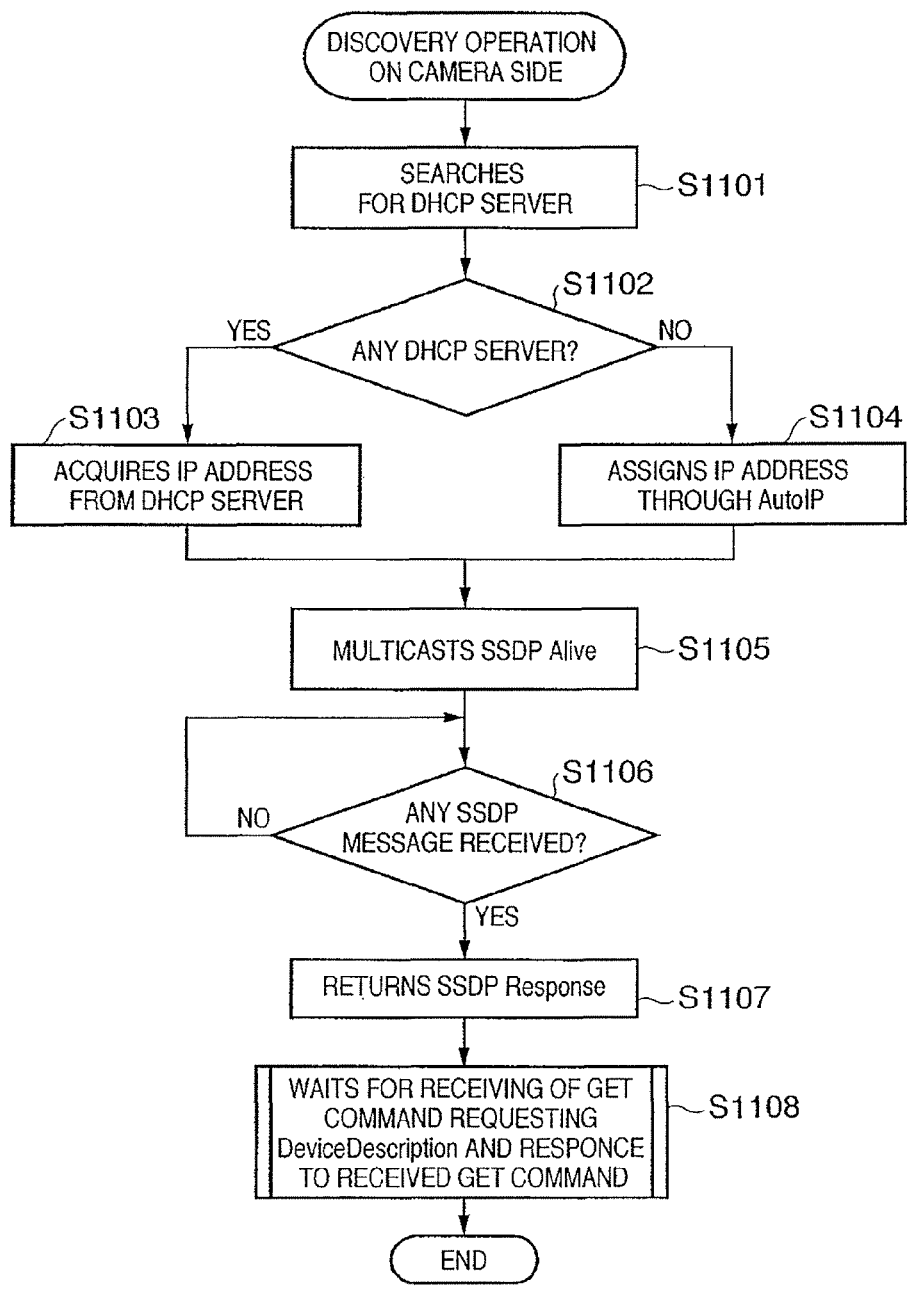
FIG. 11 is a flowchart showing a discovery operation to be performed on the digital camera side.

FIG. 11 is a flowchart showing a discovery operation to be performed on the digital camera side. The operation forms a pair with the above-described discovery operation to be performed on the PC side (control point side) in FIG. 10. It is assumed that a digital camera is connected to a network, such as a wireless LAN, which has a DHCP server.

In FIG. 11, the digital camera first searches for a DHCP server (not shown) (Step S1101). When the DHCP server is detected (YES at step S1102), an IP address is acquired from the detected DHCP server (S1103), and the process proceeds to step S1105.

On the other hand, if the DHCP server is not detected (NO at step S1102), then a private IP address is assigned with the use of the AutoIP mechanism (step S1104), and the process proceeds to step S1105.

At step S1105, an Alive Notify message of SSDP is multicast. Next, the process waits for an M-SEARCH message of SSDP from a control point (step S1106). When the message is received (YES at step S1106), a response to the message is returned (step S1107).

Next, processing to be performed in response to a GET command of HTTP requesting receive device description, from the control point, is performed (step S1108), and the process ends.

FIG. 9 is a diagram showing an example of the device description to be returned to a control point by the digital camera 100 in response to a GET command of HTTP.

In FIG. 9, though a root device is defined as a UPnP basic device to be usually used, in this example, it is an X_targetID tag and an X_on Service tag included in a service tag that characterizes the present invention. The details of these tags will be described later. In the X_targetID tag, there is stored identification information (connection-permitted counterpart identification information) enabling identification of a communication counterpart for which connection is permitted by the digital camera 100 based on the state of the digital camera 100. In the X_on Service tag, there is stored information (service connection state determination information) indicating the service connection state of the digital camera 100 based on the state of the digital camera 100.

Next, a device description reply process in the digital camera will be described with the use of FIG. 12.

Figure 12:
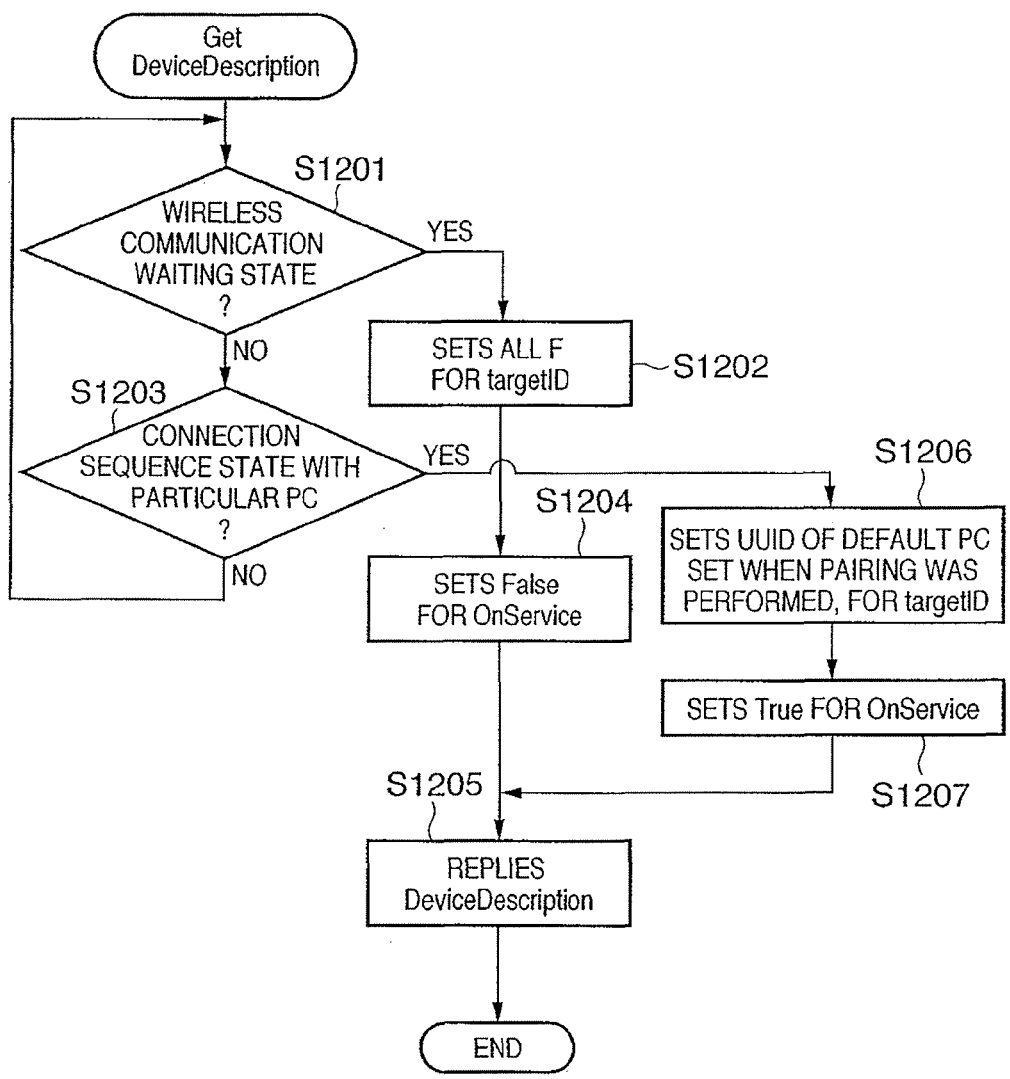
FIG. 12 is a flowchart showing a device description reply operation to be performed on the digital camera side.

FIG. 12 is a flowchart showing a device description reply operation to be performed on the digital camera side.

In FIG. 12, when the URL of device description is specified by a GET command of HTTP, from a control point, and then executed, the digital camera 100 first confirms the state of itself. Specifically, it determines whether it is in the "wireless communication waiting" state in FIG. 8 or in a different state (step S1201). As a result, if it is in the "wireless communication waiting" state (YES at step S1201), then identification information (All F) (second identification information) is set in the X_targetID tag, which indicates that, if there is a communication counterpart capable of utilizing a service in the same network, service connection is permitted to any communication counterpart (step S1202).

Next, since a service connection is not established with any communication counterpart yet in this state, False is set in the X_on Service tag (step S1204). Then, a device description script is returned (step S1205), and the process ends.

As a result of the determination at step S1202, if the digital camera 100 is not in the "wireless communication waiting" state (No at step S1202), then it is determined whether or not the digital camera has been changed into a connection sequence state to connect to a particular destination device by the user operating the digital camera 100 (step S1203). As a result, if the digital camera 100 has been changed or is being changing into a connection state with a particular destination device (YES at step S1203), then identification information (UUID) (first identification information) is set in the X_targetID tag, which indicates a communication counterpart (in this case, a default PC as a destination device) identified by a part of the above-described pairing information set when pairing is performed (step S1206). In this case, the identification information (UUID) is set for the pairing information in association with the destination device which is connected or to be connected.

Then, True is set in the X_on Service tag (step S1207), the device description script at step S1205 is replied to (step S1205), and the process ends.

Next, a discovery operation to be performed on the PC side, which is the control point side, will be described with the use of FIG. 13.

Figure 13:
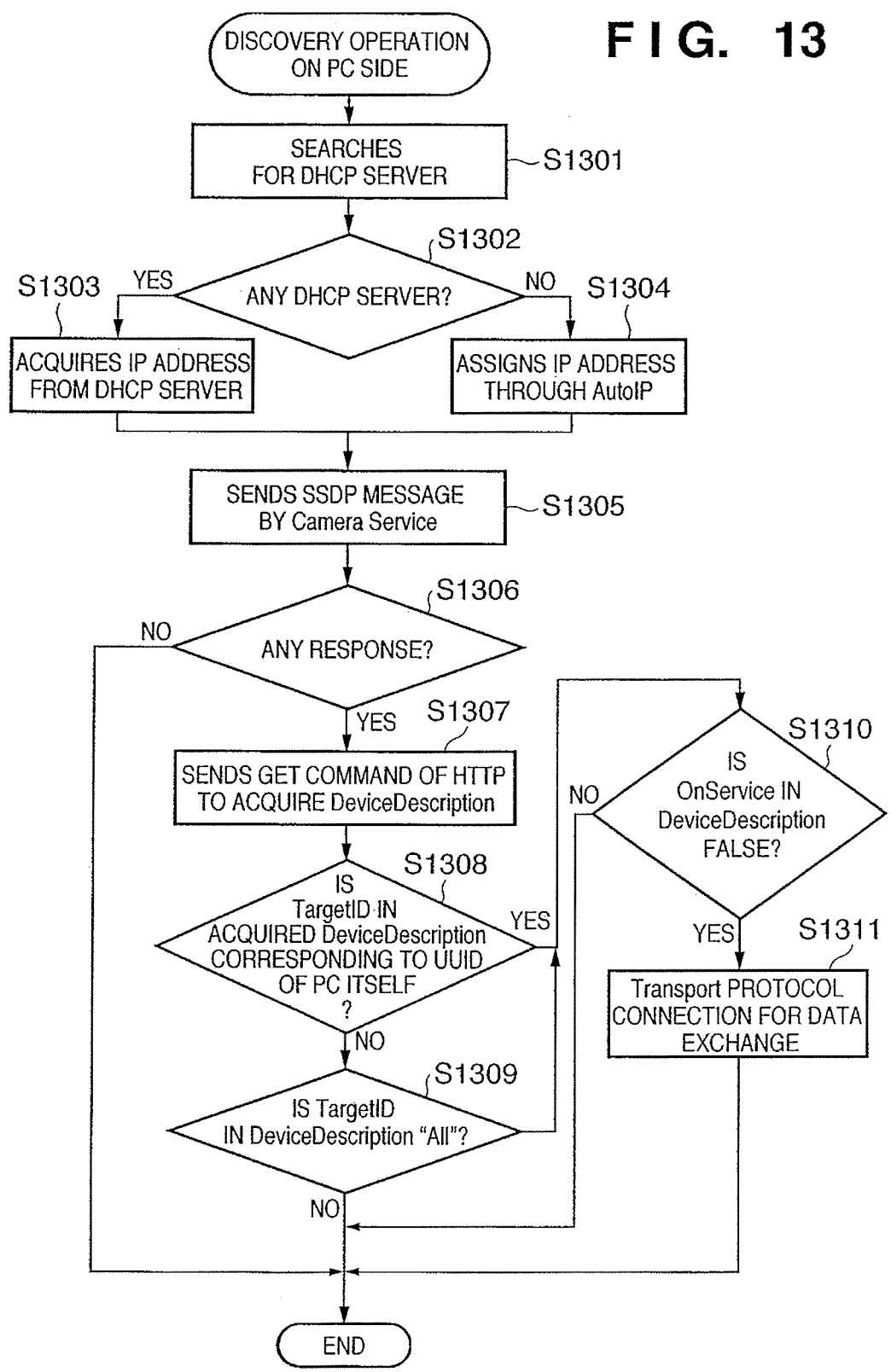
FIG. 13 is a flowchart showing a discovery operation to be performed on the PC side.

FIG. 13 is a flowchart showing the discovery operation to be performed on the PC side.

In FIG. 13, steps S1301 to S1307 are the same as steps S1001 to S1007 in FIG. 10, and a description thereof will be omitted. Here, resolution of an IP address, subsequent communication of an SSDP message and then acquisition of a device description are performed. The content of the device description acquired from a device is the same as shown in FIG. 9 and is described above. By referring to the content of the targetID tag in the acquired information, it is determined whether or not the content corresponds to an UUID, which indicates the control point which is the PC (step S1308). As a result, if it corresponds thereto, then the process proceeds to step S1310. On the other hand, if it does not correspond thereto, the process proceeds to step S1309.

At step S1309, it is determined whether or not the content of the targetID tag in the acquired information includes information indicating that it is possible to connect to an unspecified counterpart, that is, whether or not the targetID is "All". If it is determined that the targetID is All (YES at step S1309), then, by referring to the content of the X_on Service tag in the acquired information, it is determined whether or not the ON service in the device description is False (step S1310). As a result, if it is False (YES at step S1310), then a transport protocol connection for data exchange is requested to establish service connection (step S1311), and the process ends.

On the other hand, if the information is not ID information indicating the control point itself, or if it is not permitted to connect to an unspecified counterpart, at steps S1308 and S1309, then a data exchange protocol connection for establishing service connection is not made.

As a result of the determination at step S1310, if the content of the X_on Service tag in the acquired information, which has been referred to, is True (NO at step S1310), then a service connection has already been established. Therefore, a data exchange protocol connection for establishing service connection is not made.

As a result, in the case where the user specifies a destination device by operating the digital camera 100, it is possible to prevent a data exchange protocol connection for establishing a service connection from other PC's, and enable reliable connection with an intended counterpart. Furthermore, when the digital camera 100 is in a waiting state, and a counterpart has not been determined, a connection can be freely established by operating the PC.

Second Embodiment

The basic configuration of this second embodiment is the same as that of the above-described first embodiment, and description thereof will be omitted. A description will be provided below only on points different from the above-described first embodiment.

Though there is provided means for determining whether or not to make a service connection in the discovery operation in the first embodiment, the effect similar to that of the above-described first embodiment is realized in a different method in this second embodiment. Though the process before the discovery operation is the same as described above, a connection determination logic is implemented when a service connection operation of the digital camera 100 is performed.

Figure 14:
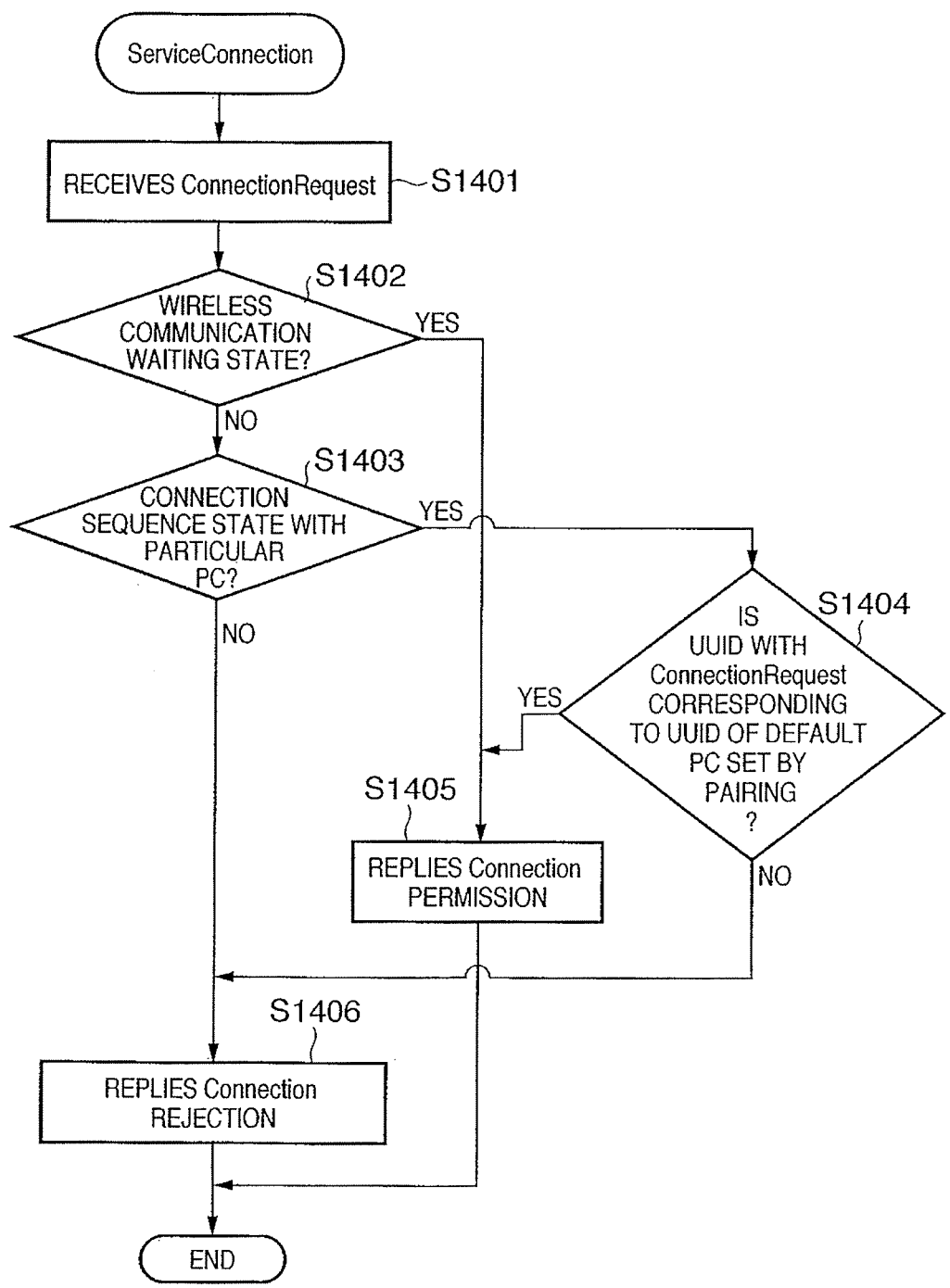
FIG. 14 is a flowchart showing a service connection reply operation to be performed on a digital camera in a second embodiment of the present invention.

FIG. 14 is a flowchart showing a service connection reply operation to be performed on a digital camera in the second embodiment of the present invention.

In FIG. 14, the digital camera 100 first receives a connection request from the side of a PC, which is a control point (step S1401). In this case, the PC sends the connection request by adding ID information identifying itself.

Next, the digital camera 100 determines whether it is in the above-described "wireless communication waiting" state in FIG. 8 or in a different state (step S1402). As a result, if it is in the "wireless communication waiting" state (YES at step S1402), then an OK indication (permission of connection) to the requested service connection is returned (step S1405). On the other hand, if it is not in the waiting state (NO at step S1402), then the digital camera 100 determines whether or not it is in a connection sequence with a particular counterpart, that is, it is in a connection sequence with a counterpart selected by the user operating the digital camera 100 (step S1403).

As a result of the determination at step S1403, if the digital camera is in a connection sequence with a particular counterpart (YES at step S1403), then the ID information (UUID) added to the connection request is referred to. The ID information is compared with the ID information (UUID) for identifying a counterpart, which is included in pairing information stored in advance in combination with the particular counterpart that the digital camera 100 is connecting to at that point (step S1404). When they correspond to each other (YES at step S1404), an OK indication is returned to the requested service connection (step S1405). When they are different from each other (NO at step S1404), an NG indication (rejection of connection) is returned (step S1406).

Thus, by making the configuration so that whether or not to permit establishment of a requested service connection is controlled in association with information which has been paired in advance and a user operation, based on the state of the digital camera 100, an effect similar to that of the above-described first embodiment can be realized.

Third Embodiment

The basic configuration of this third embodiment is the same as that of the above-described first and second embodiments, and a description thereof will be omitted. A description will be provided below only on points different from the above-described first and second embodiments.

In the second embodiment, even if the X_on Service tag among fields in the device description is omitted, an equal function can be realized. However, by using this field, it is possible for a PC, which is the control point side, to show the user why a connection has failed with the use of display means such as a dialog.

If the content of the X_targetID tag among the fields in the device description is information indicating the PC itself, and the X_on Service indicates True, then this indicates that the PC itself has already been connected. Accordingly, it is possible to understand that a service can be utilized without making the connection again.

In the above embodiments, when the digital camera 100 is in the wireless communication waiting state in FIG. 8, the screen of FIG. 6B is displayed on the display device on the digital camera 100. When the digital camera is waiting for the user to select a destination device, it enters the connection waiting state by activating a wireless module under wireless connection settings for a pairing counterpart set as a default. However, there may be required a mechanism for, when the user selects a destination device by operating the digital camera 100, informing it to multiple set devices. The operation is shown in FIG. 15.

Figure 15:
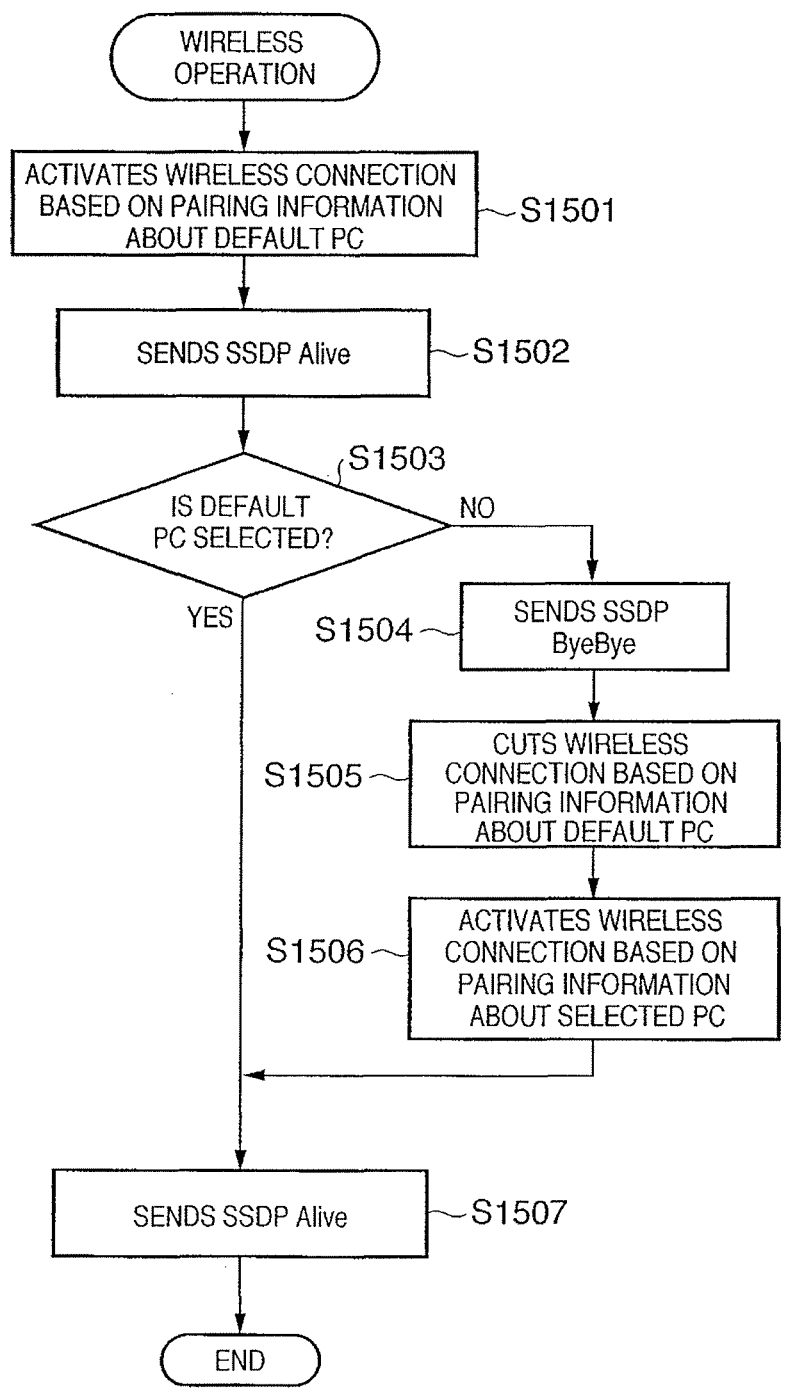
FIG. 15 is a flowchart showing an operation accompanying the switching of destination devices on a digital camera in a third embodiment of the present invention.

FIG. 15 is a flowchart showing an operation accompanying the switching of a destination device on the digital camera in the third embodiment of the presents invention.

In FIG. 15, the digital camera 100 first activates a wireless connection module based on pairing information about a default PC to change into a communication enabled state, similarly to the above-described embodiments (step S1501). Next, an SSDP Alive message is multicast to the network (step S1502).

Subsequently, the digital camera 100 enters the above-described wireless communication waiting state. In this case, if a PC selected as a destination device by the user is the default PC currently set (YES at step S1503), then the SSDP Alive message is multicast again (step S1507), and the process ends. The control point side is configured to acquire the device description again. As a result, when the Alive message is received, an update of the content of the targetID tag and the X_on Service tag in the device description can be detected, similarly to the above-described first and second embodiments.

On the other hand, if the selected PC is not the default PC (NO at step S1503), then an SSDP ByeBye message is sent through multicast to the network of the default PC currently set (step S1504).

Next, the wireless connection is cut based on the pairing information about the default PC (step S1505); the wireless module is activated again based on the pairing information about the selected PC (step S1506); and an SSDP Alive message is multicast to a new network (step S1507).

According to the configuration described above, even if a different network is set for a selected destination device, an effect similar to that of the above-described first and second embodiments can be realized.

Furthermore, if the selected destination device belongs to the same network as the counterpart set as the default, it is possible to omit the processings from step S1504 to step S1506 and only multicast an SSDP Alive message at step S1507. As a result, since disconnection and reconnection of a wireless network is not performed, an effect of speeding up the switching is obtained.

The object of the present invention can be achieved by providing a system or a device with a recording medium on which a program codes of software for realizing the function of the above-described embodiments is recorded, and then a computer (or a CPU, an MPU or the like) of the system or the device reading and executing the program code stored in the recording medium.

In this case, the program code itself which has been read from the recording medium realizes the function of the above-described embodiments, and the recording medium on which the program code is recorded constitutes the present invention.

As the recording medium for providing the program code, for example, a Floppy® disk, a hard disk, a magneto-optic disk, a CD-ROM, a CD-R, a CD-RW, a DVD-ROM, a DVD- RAM, a DVD-RW, a DVD+RW, magnetic tape, a non-volatile memory card, a ROM and the like can be used.

It is not only by executing the program code read by a computer that the function of the embodiments described above can be realized. It goes without saying that the case is also included where the function of the embodiments described above is realized by an OS (operating system) or the like, which is operating on the computer, performing a part or all of the actual processing based on the instructions of the program code.

Furthermore, the case is also included where the program code read from the recording medium is written in a memory provided for a feature expansion board inserted in the computer or a feature expansion unit connected to the computer, and then the function of the embodiments described above is realized by the CPU or the like provided for the feature expansion board or the feature expansion unit performing a part or all of the actual processing based on the instructions of the program code.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-247090 filed on Aug. 26, 2004, which is hereby incorporated by reference herein.

The invention claimed is:

1. An image input device capable of wireless communication, comprising:
   a setting unit, configured to set external device identification information for each of at least one external device, by communicating with the at least one external device, in advance;
   a storage unit configured to store the external device identification information set by the setting unit;
   an instruction unit configured to instruct, when no external device is connected to the image input device, the start of connection with an external device;
   a selection unit configured to select an external device based on the external device identification information stored in the storage unit; and
   a control unit configured to control the image input device so as to transition into a state for establishing a wireless connection using a predetermined transmission protocol with the selected external device based on the set external device identification information when the start of connection is instructed,
   wherein the control unit comprises:
   (a) a first transition unit configured to transition the image input device into a first state for establishing the wireless connection using the predetermined transmission protocol with any external device identified by the set external device identification information; and
   (b) a second transition unit configured to transition the image input device into a second state for establishing the wireless connection using the predetermined transmission protocol with the selected external device and not establishing the wireless connection using the predetermined transmission protocol with an external device other than the selected external device, and
   wherein the control unit controls the image input device so as to transition into the first state after the start of connection is instructed and before the selection is made by the selection unit, and so as to transition into the second state from the first state after the selection is made by the selection unit.

2. The image input device according to claim 1, further comprising a display unit configured to display, in response to an instruction received by the instruction unit, a selection screen including an external device list corresponding to the set external device identification information, and
   wherein the selection unit performs the selection via the selection screen.

3. The image input device according to claim 1, further comprising a response replying unit configured to return reply data identifying the external device with which the image input device is allowed to establish a connection, in response to an information acquisition request sent from the external device.

4. The image input device according to claim 3, wherein if the information acquisition request is received when the image input device is in the first state, the response replying unit returns the reply data identifying any external device identified by the external device identification information set by the setting unit as being allowed to establish a connection with the image input device.

5. The image input device according to claim 3, wherein if the information acquisition request is received when the image input device is in the second state and if the external device has been selected by the selecting unit, the response replying unit returns the reply data identifying the selected external device as being allowed to establish a connection with the image input device.

6. The image input device according to claim 3, wherein the information acquisition request sent from the external device comprises an HTTP GET request, and
   wherein the response reply unit returns the reply data as a tagged value using XML.

7. The image input device according to claim 4, wherein the response reply unit returns the reply data as a tagged value using XML, and
   wherein the reply data identifying any external device identified by the external device information set by the setting unit as being allowed to establish a connection comprises the word "All" to signify that any such device is allowed to establish a connection.

8. The image input device according to claim 3, wherein the reply data identifying the external device with which the image input device is allowed to establish a connection is returned as a tagged value using XML,
   wherein the reply data signifies to the external device that sent the information acquisition request that a connection is allowed to be established if the reply data identifies the external device that sent the information acquisition request, and
   wherein the reply data signifies to the external device that sent the information acquisition request that a connection is not allowed to be established if the reply data identifies an external device other than the external device that sent the information acquisition request.

9. A control method for an image input device capable of wireless communication, the control method comprising:
   a setting step to set external device identification information for each of at least one external device, by communicating with the at least one external device, in advance;
   a storing step to store the external device identification information set by the setting step;
   an instructing step to instruct, when no external device is connected to the image input device, the start of connection with an external device;

a selection step to select an external device based on the external device identification information stored in the storing step; and a controlling step to control the image input device so as to transition into a state for establishing a wireless connection using a predetermined transmission protocol with the selected external device based on the set external device identification information when the start of connection is instructed, wherein the controlling step comprises:

(a) a first transition step to transition the image input device into a first state for establishing the wireless connection using the predetermined transmission protocol with any external device identified by the set external device identification information; and (b) a second transition step to transition the image input device into a second state for establishing the wireless connection using the predetermined transmission protocol with the selected external device and not establishing the wireless connection using the predetermined transmission protocol with an external device other than the selected external device, and wherein the controlling step controls the image input device so as to transition into the first state after the start of connection is instructed and before the selection is made by the selection step, and so as to transition into the second state from the first state after the selection is made by the selection step.

10. A program embodied on a non-transitory computer-readable medium for causing a computer to perform a control method for an image input device capable of wireless communication, the program comprising:

a setting module that sets external device identification information for each of at least one external device, by communicating with the at least one external device, in advance;

a storage module that stores the external device identification information set by the setting module;

an instructing module that instructs, when no external device is connected to the image input device, the start of connection with an external device;

a selection module that selects an external device based on the external device identification information stored in the storage module; and a controlling module that controls the image input device so as to transition into a state for establishing a wireless connection using a predetermined transmission protocol with the selected external device based on the set external device identification information when the start of connection is instructed, wherein the controlling module comprises:

(a) a first transition module to transition the image input device into a first state for establishing the wireless connection using the predetermined transmission protocol with any external device identified by the set external device identification information; and (b) a second transition module to transition the image input device into a second state for establishing the wireless connection using the predetermined transmission protocol with the selected external device and not establishing the wireless connection using the predetermined transmission protocol with an external device other than the selected external device, and wherein the controlling module controls the image input device so as to transition into the first state after the start of connection is instructed and before the selection is made by the selection module, and so as to transition into the second state from the first state after the selection is made by the selection module.

* * * * *